US006760289B1

(12) United States Patent
Ide

(10) Patent No.: US 6,760,289 B1
(45) Date of Patent: Jul. 6, 2004

(54) OPTICAL DISC DRIVE AND METHOD OF DISCRIMINATING VARIOUS TYPES OF OPTICAL DISCS

(76) Inventor: Koji Ide, c/o Mitsumi Electric Co., Ltd. Atsugi Operations Base, 1601, Sakai, Atsugi-shi, Kanagawa (JP)

(*) Notice: Subject to any disclaimer, the term of this patent is extended or adjusted under 35 U.S.C. 154(b) by 0 days.

(21) Appl. No.: 09/399,527

(22) Filed: Sep. 20, 1999

(30) Foreign Application Priority Data

Sep. 18, 1998 (JP) ............................................ 10-265531

(51) Int. Cl.[7] .................................................. G11B 7/00
(52) U.S. Cl. .................................... 369/53.2; 369/53.22
(58) Field of Search ........................... 369/44.25, 44.26, 369/53.2, 53.23, 53.22

(56) References Cited

U.S. PATENT DOCUMENTS

| 5,642,340 | A | * | 6/1997 | Nomura ................... 369/44.25 |
| 5,831,952 | A | * | 11/1998 | Yamada et al. ............... 369/58 |
| 6,147,941 | A | * | 11/2000 | Kumagai ................... 369/53.2 |
| 6,240,054 | B1 | * | 5/2001 | Takeya et al. ........... 369/44.29 |
| 6,272,087 | B1 | * | 8/2001 | Hirashima ............... 369/53.22 |
| 6,278,672 | B1 | * | 8/2001 | Kobayashi ............... 369/53.23 |
| 6,285,635 | B1 | * | 9/2001 | Watanabe et al. ........ 369/44.27 |
| 6,295,260 | B1 | * | 9/2001 | Shihara et al. ............. 369/53.2 |

FOREIGN PATENT DOCUMENTS

| DE | 196 09 575 A1 | 9/1997 |
| EP | 0 840 303 A2 | 10/1997 |
| EP | 0 813 192 A1 | 12/1997 |
| EP | 0 856 839 A1 | 1/1998 |
| EP | 0 899 732 A1 | 3/1999 |
| GB | 2 309 816 | 8/1997 |

OTHER PUBLICATIONS

Patent Abstracts of Japan, No. 63268159, Nov. 4, 1988.
Patent Abstracts of Japan, No. 08321129, Dec. 3, 1996.
Patent Abstracts of Japan, No. 09270167, Oct. 14, 1997.

* cited by examiner

*Primary Examiner*—Nabil Hindi
(74) *Attorney, Agent, or Firm*—Patents+TMS, P.C.

(57) ABSTRACT

An optical disc drive which is capable of easily and reliably recording information onto and/or playing back information recorded on various types of optical discs having different reflectances is disclosed. The optical disc drive has a rotational drive mechanism for rotating the optical disc loaded in the optical disc drive; an optical pick-up which includes an objective lens, an actuator, a laser diode and a split photodiode; an optical pick-up moving mechanism; a control means; an RF amplifier IC; a servo processor; a decoder; a memory; and a casing for housing all these elements. After moving a disc tray to the loaded position, the optical disc forces the objective lens to move in the optical axis direction to generate a focus error signal. Then, after calculating an amplitude of the generated focus error signal, the optical disc drive discriminates the presence or absence of an optical disc and the disc type of the optical disc loaded in the optical disc drive. Namely, the optical disc drive discriminates whether or not the optical disc loaded in the optical disc drive is a high-reflectance optical disc such as CD-R or a low-reflectance optical disc such as CD-RW.

22 Claims, 5 Drawing Sheets

OPTICAL DISC DRIVE AND METHOD OF DISCRIMINATING VARIOUS TYPES OF OPTICAL DISCS

BACKGROUND OF THE INVENTION

1. Field of the Invention

The present invention relates to an optical disc drive which can play back information recorded on and/or record information onto various types of optical discs and a method of discriminating the various types of the optical discs.

2. Description of the Prior Art

Optical disc drives which can playing back information recorded on and/or record information onto an optical disc such as a CD (compact disc), CD-ROM, CD-R or CD-RW are known in the prior art.

Among such optical discs, the CD, CD-ROM and CD-R are classified as high-reflectance optical discs due to the characteristics of their respective recording layers. Further, the CD-RW is classified as a low-reflectance optical disc.

Recently, optical disc drives which are capable of playing back information recorded on various types of high-reflectance optical discs with a single disc drive have been proposed. For example, an optical disc drive which can play back not only information recorded on a CD-ROM but also information recorded on a CD-R is known.

However, up to the present time, there has been no optical disc drive which is capable of playing back both high-reflectance optical discs and low-reflectance optical discs.

SUMMARY OF THE INVENTION

It is therefore an object of the present invention to provide an optical disc drive which is capable of easily and reliably playing back and/or recording various types of optical discs having different reflectances (i.e., high-reflectance optical discs and low-reflectance optical discs), and a method of discriminating such various types of optical discs.

In view of this object, the present invention is directed to an optical disc drive which can play back information recorded on and/or record information onto at least two types of optical discs having different reflectances. The disc drive comprises:

a rotational drive mechanism for rotating an optical disc to be loaded in the optical disc drive;

an optical pick-up having an objective lens, said optical pick-up emitting light beam onto the loaded optical disc and receiving the light beam reflected by the optical disc through the objective lens, to generate detection signals in response to the amount of the received light beam;

focus error signal generating means for generating a focus error signal based on the detection signals; and optical disc discrimination means for discriminating a disc type of the loaded optical disc based on the amplitude of the focus error signal.

In this optical disc drive according to the present invnetion, the amplitude of the focus error signal varies depending on the reflectances of the respective optical discs. Specifically, in the present invention, the at least two types of optical discs include a high-reflectance optical disc and a low-reflectance optical disc.

According to the disc drive as described above, it is possible to play back information recorded on and/or record information onto various types of optical discs having different reflectances (i.e., high-reflectance optical discs and low-reflectance optical discs).

In the present invention, it is preferred that the focus error signal is produced by displacing the objective lens in the optical axis direction, and then the optical disc discrimination means discriminates whether or not the loaded optical disc is a high-reflectance optical disc or a low-reflectance optical disc based on the thus produced focus error signal.

Further, in the present invention, it is preferred that if the reflectance of a high-reflectance optical disc to be loaded in the optical disc drive is designated by "α" and the reflectance of a low-reflectance optical disc to be loaded in the optical disc drive is designated by "β", then the value of "α/β" is greater than or equal to 2.5.

Moreover, in the present invention, it is preferred that the optical disc discrimination means discriminate whether or not the loaded optical disc is a high-reflectance optical disc or a low-reflectance optical disc by comparing an amplitude of the focus error signal or a vale corresponding thereto with a predetermined threshold value.

In the present invention, it is also preferred to further comprise means for setting recording conditions and/or playing back conditions corresponding to the type of the loaded optical disc based on the result of the discrimination by the optical disc discrimination means. This setting means sets recording and/or playing back conditions corresponding to a high-reflectance optical disc in the case where the loaded optical disc loaded is discriminated as a high-reflectance optical disc by the optical disc discrimination means, and sets recording and/or playing back conditions corresponding to a low-reflectance optical disc in the case where the loaded optical disc loaded in the optical disc drive is discriminated as a low-reflectance optical disc by the optical disc discrimination means.

In this way, the optical disc drive according to the present invention makes it possible to reliably record information onto various types of optical discs having different reflectances and/or playback information recorded on the various types of the optical discs.

In this case, the conditions to be set by the setting means may include a focus servo gain and/or a tracking servo gain.

Further, in the present invention, the optical disc discrimination means may have a further function for judging as to whether or not an optical disc is loaded in the optical disc drive.

In this way, it is possible to prevent the optical disc drive from starting the process for recording or playing back information when no optical disc is placed on the disc tray which has been moved from the eject position to the loaded position.

Furthermore, it is also preferred that the optical disc discrimination means judges as to whether or not the loaded optical disc is a low-reflectance optical disc in the case where no high-reflectance optical disc has been detected by the discrimination means.

Another aspect of the present invention is directed to a method of discriminating a disc type of an optical disc loaded in an optical disc drive which can play back information recorded on and/or record information onto at least two types of optical discs having different reflectances. This method comprises the steps of:

rotating the optical disc loaded in the optical disc drive;

emitting light beam from an optical pick-up onto the loaded optical disc and receiving the light beam reflected by the optical disc by the optical pick-up, to generate detection signals in response to the amount of the received light beam;

producing a focus error signal based on the detection signals; and discriminating a disc type of the loaded optical disc based on the amplitude of the focus error signal which varies depending on the reflectance of the optical discs.

In this method, the at least two types of optical discs include a high-reflectance optical disc and a low-reflectance optical disc.

Further, in this method, the focus error signal is produced by displacing the objective lens in the optical axis direction, and then the loaded optical disc is discriminated as a high-reflectance optical disc or a low-reflectance optical disc based on the thus produced focus error signal.

Furthermore, in this method, it is preferred that if the reflectance of the high-reflectance optical disc to be loaded in the optical disc drive is designated by "α" and the reflectance of the low-reflectance optical disc to be loaded in the optical disc drive is designated by "β" then the value of "α/β" is greater than or equal to 2.5.

Moreover, in this method, It is preferred that the discrimination is carried out by comparing an amplitude of the focus error signal or a vale corresponding thereto with a predetermined threshold value.

Further, in the present invention, it is preferred that the discriminating step includes a first step for Judging as to whether the loaded optical disc is a high-reflectance optical disc or not, and a second step for judging as to whether the loaded optical disc is a low-reflectance optical disc or not, wherein the second step is carried out in the case where no high-reflectance optical disc is detected by the first step.

In this case, it is preferred that the focus servo gain at the first step is grater than that at the second step. Alternatively, the amplification factor for the focus error signal at the first step can be grater than that at the second step.

Furthermore, in the method of the present invention, it is also preferable to further comprise a step for Judging as to whether or not an optical disc is loaded in the optical disc drive.

The above described and other objects, structures and advantages of the present invention will be apparent when the following description of the preferred embodiment will be considered in conjunction with the appended drawings.

DETAILED DESCRIPTION OF PREFERRED EMBODIMENTS

With reference to the appended drawings, a detailed description of the preferred embodiment of an optical disc drive according to the present invention will be given below.

Figure 1:
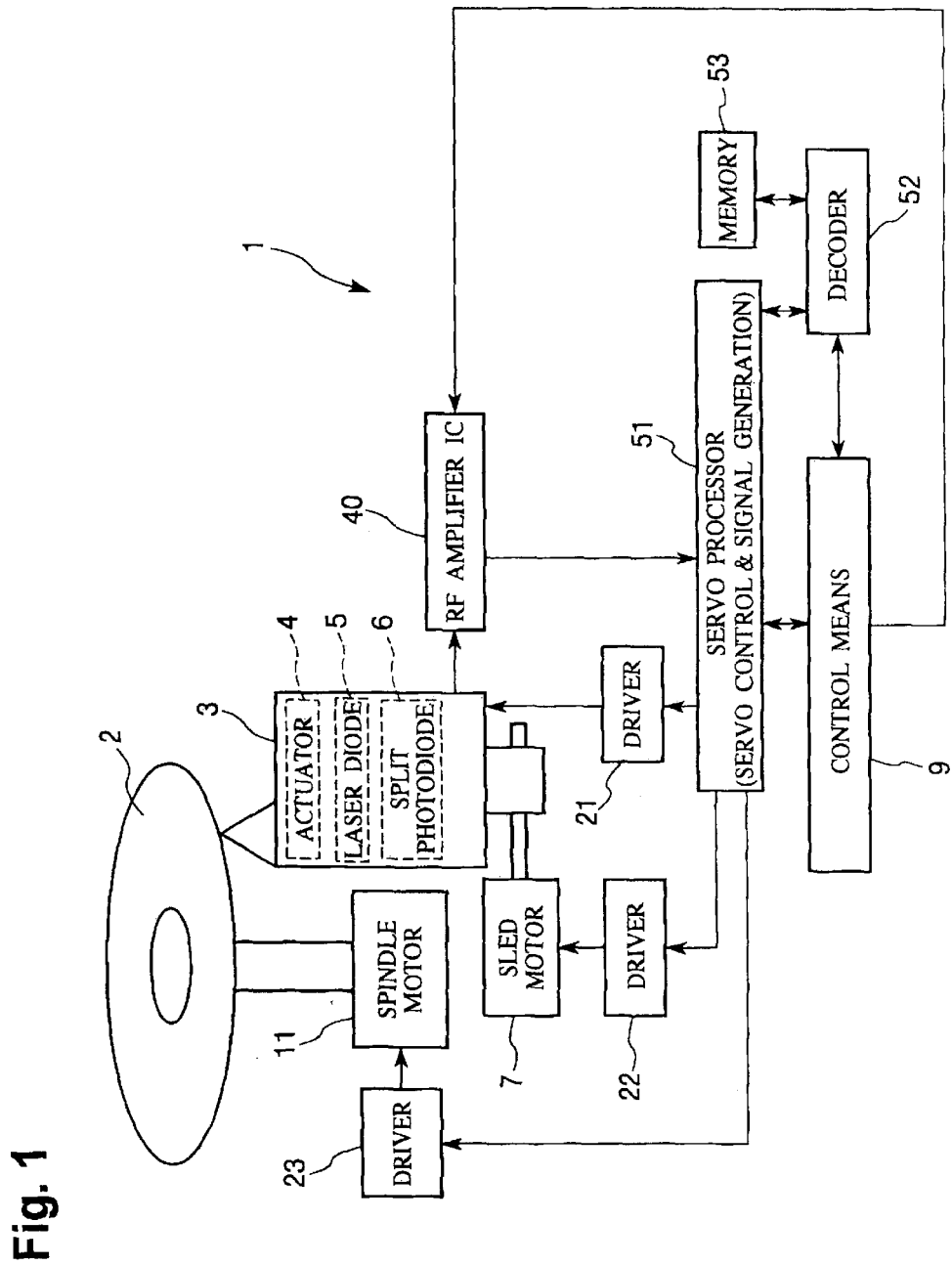
FIG. 1 is a block diagram which generally shows a circuit configuration of a preferred embodiment of an optical disc drive according to the present invention.
Figure 2:
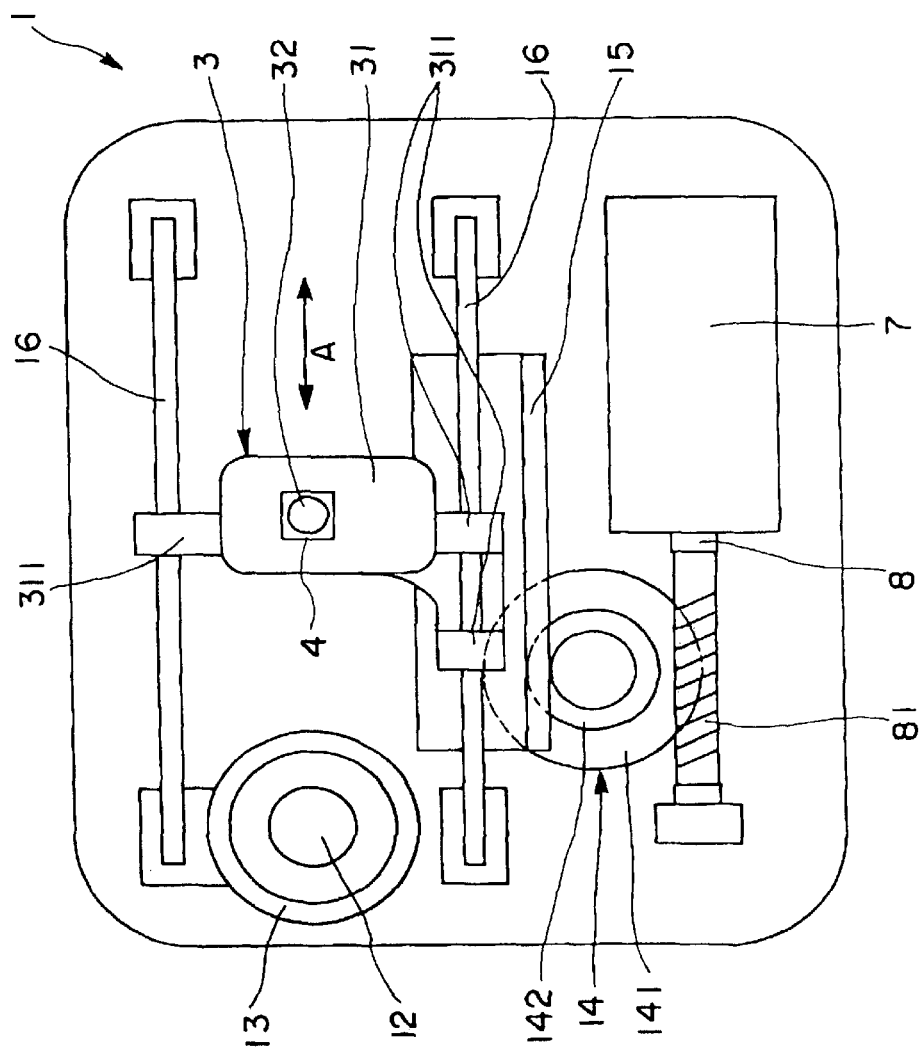
FIG. 2 is a plan view which generally shows components around an optical pick-up of the optical disc drive according to the present invention.
Figure 3:
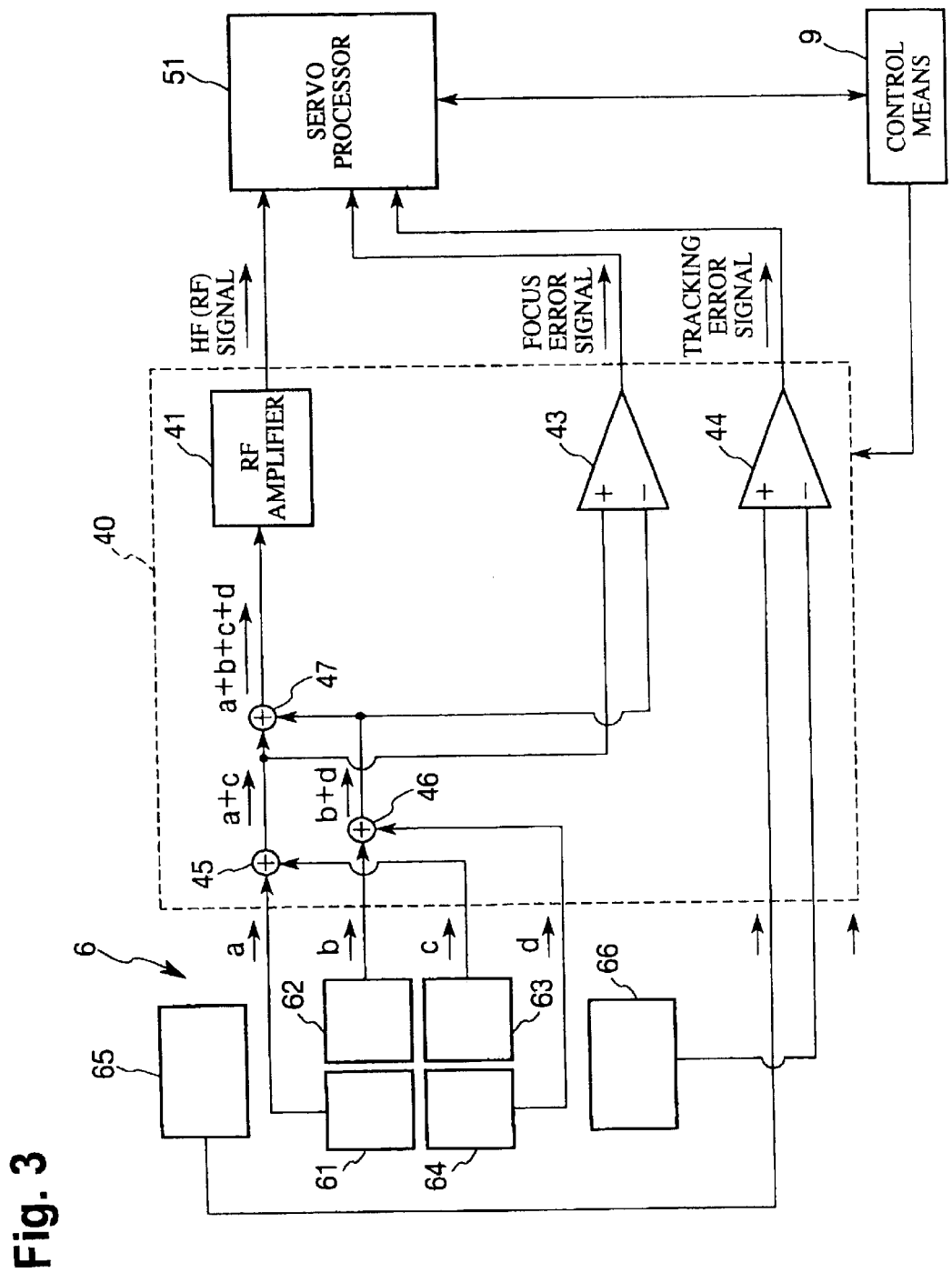
FIG. 3 is a block diagram showing a control means, an RF amplifier IC and a split photodiode of an optical pick-up of the optical disc drive shown in FIG. 1.

FIG. 1 is a block diagram which generally shows a circuit configuration of the preferred embodiment of the optical disc drive according to the present invention. FIG. 2 is a plan view which generally shows components around an optical pick-up of the optical disc drive according to the present invention. FIG. 3 is a block diagram showing a control means, an RF amplifier IC and a split photodiode of an optical pick-up of the optical disc drive shown in FIG. 1.

The optical disc drive 1 shown in these drawings is designed to play various types of optical discs 2 having different reflectances. Namely, in addition to playing back information recorded on a high-reflectance optical disc (CD-ROM in the present embodiment), the optical disc drive 1 can also play back information recorded on a low-reflectance optical disc (CD-RW in the present embodiment).

In this connection, the optical disc drive 1 is able to recognize high-reflectance and low-reflectance optical discs based on the reflectance of laser light (laser beam) emitted from a laser diode (light source) 5. Namely, an optical disc 2 which reflects more than 60%, and in particular roughly 70%–90%, of the laser light (laser beam) from the laser diode (light source) 5 will be recognized as a "high-reflectance optical disc", and an optical disc which reflects less than 25%, and in particular roughly 10%–20%, of the laser light (laser beam) from the laser diode (light source) 5 will be recognized as a "low-reflectance optical disc".

The comparison between the reflectance of the high-reflectance optical disc and the reflectance of the low-reflectance optical disc is as follows. Namely, if the reflectance of the high-reflectance optical disc is designated by "α" and the reflectance of the low-reflectance optical disc is designated by "β", then the value of "α/β" is greater than or equal to 2.5, and in particular lies roughly in the range 3–7.

In this connection, it is to be understood that a track is formed on the optical disc 2 in a spiral manner.

The optical disc drive 1 includes a rotational drive mechanism for rotating the optical disc 2 loaded in the optical disc drive 1. This rotational drive mechanism is mainly constructed from a spindle motor 11 for rotating a turntable, a driver 23 for driving the spindle motor 11, and a turntable 13 which is fixed to the rotation axle 12 of the spindle motor 11 for supporting the optical disc 2 thereon.

Further, the optical disc drive 1 includes an optical pick-up (optical pick-up) 3 which can move in the direction of the arrow A shown in FIG. 2; an optical pick-up moving mechanism for moving the optical pick-up 3 in the direction of the arrow A shown in FIG. 2; a control means 9; an RF amplifier IC 40; a servo processor (DSP) 51; a decoder 52; a memory (e.g., RAM or the like) 53; and a casing (not shown in the drawings) for housing all these elements. In this regard, the direction of the arrow A in FIG. 2 corresponds to a radial direction of the optical disc 2 loaded in the optical disc drive 1. In other words, the direction of the arrow A in FIG. 2 corresponds to a radial direction of the turntable 13 of the optical disc drive 1. Hereinafter, this radial direction of the optical disc 2 (radial direction of the turntable 13) will be referred to simply as "the radial direction".

The optical pick-up 3 Includes an optical pick-up body (optical pick-up base) 31 equipped with the laser diode (light source) 5 and a split photodiode (light-receiving portion) 6, and an objective lens (converging lens) 32.

Further, the optical pick-up 3 is constructed so as to be capable of emitting one main laser beam and two sub laser beams, respectively. In this regard, the play back of information recorded on the optical disc 2 is carried out using the main laser beam.

As shown in FIG. 3, the split photodiode 6 includes six individual light-receiving portions 61–66. In particular, the split photodiode 6 includes the individual light-receiving portions 61–64 for receiving the reflection of the main laser beam from the optical disc 2; the individual light-receiving portion 65 for receiving the reflection of one of the sub laser beams from the optical disc 2; and the individual light-receiving portion 66 for receiving the reflection of the other sub laser beam from the optical disc 2.

The objective lens 32 is supported by suspension springs (not shown in the drawings) provided on the optical pick-up body 31. Further, the objective lens 32 is arranged so as to be movable with respect to the optical pick-up body 31 in both the radial direction and the optical axis direction of the objective lens 32. In this way, when the objective lens 32 is deviated away from its neutral position (center point), the restoring force of the suspension springs will bias the objective lens 32 back toward the neutral position. In this connection, the direction of the optical axis of the objective lens 32 corresponds to the direction of the rotation axis of the optical disc 2 (that is, corresponds to the direction of the rotation axis of the turntable 13). Hereinafter, the direction of the optical axis of the objective lens 32 will be referred to simply as the "optical axis direction", and the direction of the rotation axis of the optical disc 2 will be referred to simply as the "rotation axial direction".

Further, as shown in FIGS. 1 and 2, the optical pick-up 3 includes an actuator 4 for moving the objective lens 32 with respect to the optical pick-up body 31. The actuator 4 includes a tracking actuator for moving the objective lens 32 in the radial direction, and a focusing actuator for moving the objective lens 32 in the optical axis direction (rotation axial direction) with respect to the optical pick-up body 31.

The tracking actuator and the focusing actuator of the actuator 4 are respectively driven by a driver 21.

Further, three support portions (sliders) 311 which slide along guide shafts 16 (described below) are formed on the optical pick-up body 31.

The optical pick-up moving mechanism is mainly constructed of a sled motor 7 equipped with a rotation axle 8, a driver 22 for driving the sled motor 7, a lead screw (worm gear) 81 fixed to the rotation axle 8 of the sled motor 7, a reduction gear 14, a rack gear 15, the pair of guide shafts 16 for guiding the optical pick-up 3, and the three support portions (sliders) 311 described above.

The reduction gear 14 includes a worm wheel 141 which meshes with the lead screw 81, and a pinion gear 142 which has a smaller radius than the worm wheel 141 and which is fixed in a concentric manner to the worm wheel 141.

The rack gear 15 meshes with the pinion gear 142. Further, the rack gear 15 is fixed to the optical pick-up body 31.

As described above, the support portions 311 of the optical pick-up 3 are supported for sliding movement on the guide shafts 16. Accordingly, the optical pick-up 3 is able to slide along the pair of guide shafts 16. The actual movement of the optical pick-up 3 will be described below.

First, the sled motor 7 is driven to rotate the lead screw 81 in predetermined direction. In accordance with this rotation of the lead screw 81, the worm wheel 141 and the pinion gear 142 are rotated in a predetermined direction. Then, the rack gear 15 which meshes with the pinion gear 142 transfers the rotational motion of the pinion gear 142 to the support portions 311 of the optical pick-up 3 to cause the optical pick-up 3 to undergo linear motion. In this way, the optical pick-up 3 is made to move in a predetermined direction along the guide shafts 16.

Conversely, when the rotation axle 8 of the sled motor 7 and the lead screw 81 are rotated in the opposite direction to that described above, the optical pick-up 3 will move along the guide shafts 16 in the opposite direction to that described above.

As shown in FIG. 3, the RF amplifier IC 40 includes an RF amplifier 41, differential amplifiers 43 and 44, and adders 45, 46 and 47. Further, amplification factors of the RF amplifier 41 and the differential amplifiers 43 and 44 are variable.

As is common practice, the control means 9 is mainly constructed from a microcomputer (CPU). The control means 9 carries out overall control of the optical disc drive 1. Namely, in addition to controlling elements such as the actuator 4 of the optical pick-up 3 and the laser diode 5, the control means 9 also controls elements such as the sled motor 7, the spindle motor 11, the RF amplifier IC 40, the servo processor 51, the decoder 52 and the memory 53.

The control means 9 carries out the main functions of optical disc discrimination means and setting means (condition setting means) of this invention.

Further, the RF amplifier IC 40 carries out the main functions of focus error signal generating means of this invention.

Furthermore, an external device (e.g., a computer) may be removably connected to the optical disc drive 1 via an interface control section (not shown in the drawings). In this way, communication can be carried out between the optical disc drive 1 and the external device.

Next, the operations of the optical disc drive 1 will be described.

First, the optical disc drive 1 moves the optical pick-up 3 on a target track (target address). Then, when the optical pick-up 3 reaches the target track, the optical disc drive 1 carries out various controls such as focus servo control, tracking servo control, sled servo control and rotation frequency control (rotation speed control). In this way, the optical disc drive 1 reads out (plays back or reproduce) the information (data) from the optical disc 2.

As shown in FIG. 1, during playback of the information, the laser beam from the laser diode 5 of the optical pick-up 3 is emitted onto a predetermined track of the optical disc 2. This laser beam is reflected by the optical disc 2. Then, the laser light reflected by the optical disc 2 is received by the split photodiode 6 of the optical pick-up 3.

As shown in FIG. 3, a current is outputted in response to the amount of light received by each of the individual light-receiving portions 61–66 of the split photodiode 6. The currents outputted from the light-receiving portions 61–66 are converted by an I–V amplifier (current-voltage conversion section; not shown in the drawings) into respective voltages (detection signals) "a"–"f", and then they are outputted from the optical pick-up 3.

Each of the detection signals "a"–"f" is inputted into the RF amplifier IC 40. In the RF amplifier IC 40, an HF (RF) signal is generated by carrying out addition and amplification and other operations to the detection signals "a"–"d".

Namely, the detection signal "a" outputted from the light-receiving portion 61 and the detection signal "c" outputted from the light-receiving portion 63 are added by the adder 45. Further, the detection signal "b" outputted from the light-receiving portion 62 and the detection signal "d" outputted from the light-receiving portion 64 are added by the adder 46. Next, the signal (a+c) outputted from the adder 45 and the signal (b+d) outputted from the adder 46 are added by the adder 47, and the signal (a+b+c+d) outputted from the adder 47 is inputted into the RF amplifier 41. Then, the RF amplifier 41 amplifies the signal (a+b+c+d) by a prescribed amplification factor to output an HF signal.

This HF signal is an analog signal which corresponds to the pits and lands formed onto the optical disc 2.

The HF signal is inputted into the servo processor 51. In the servo processor 51, the inputted HF signal is digitized and then subjected to EFM (Eight to Fourteen Modulation) demodulation. Then, after being decoded (converted) into predetermined formatted data (data signals) in the servo processor 51, such converted data is inputted into the decoder 52.

Then, after this data is decoded by the decoder 52 into data having a predetermined format for communication (transmission), such decoded data is transmitted to an external device (e.g., a computer) via an interface control section (not shown in the drawings).

Next, a description will be given for the tracking control, sled control and focus control carried out by the optical disc drive 1 when playing back information recorded on the optical disc 2.

As described above, each of the detection signals "a"–"f" is inputted into the RF amplifier IC 40, respectively.

The RF amplifier IC 40 generates a tracking error (TE) signal (voltage) based on the detection signals "e" and "f".

Namely, the detection signal "e" is inputted into the non inverting input terminal (positive input terminal) of the differential amplifier 44, the detection signal "f" is inputted into the inverting input terminal (negative input terminal) of the differential amplifier 44, and then the differential amplifier 44 amplifies the value of the difference between these signals (e–f) by a predetermined amplification factor to output a tracking error signal.

This tracking error signal is a signal indicating the amount of deviation of the objective lens 32 in the radial direction with respect to the center of the target track. Namely, the tracking error signal is a signal which indicates both the amount and the direction of the deviation of the objective lens 32 in a radial direction with respect to the center of the target track.

Next, the tracking error signal is inputted into the servo processor 51. After carrying out predetermined signal processing operations (i.e., phase inversion, amplification and the like) for the tracking error signal, the servo processor 51 generates a tracking servo signal (voltage). Then, a predetermined driving voltage responsive to such tracking servo signal is applied to the actuator 4 via the driver 21. By driving the actuator 4, the objective lens 32 is moved toward the center of the track. Namely, a tracking servo operation is carried out based on the generated tracking servo signal.

At this point, it should be mentioned that it is not possible to make the objective lens 32 sufficiently follow the target track if only the actuator 4 is driven. Accordingly, sled control is also carried out to make it possible for the objective lens 32 to fully follow the target track. Namely, when the amount of the movement of the objective lens 32 exceeds a predetermined number of tracks, the sled motor 7 is driven via the driver 22 to move the optical pick-up body 31 in the same direction as the direction of movement of the objective lens 32. Thus, by carrying out such controls, it becomes possible to return the objective lens 32 to the neutral position.

Further, the RF amplifier IC 40 generates a focus error (FE) signal (voltage) based on the detection signals "a"–"d".

Namely, the signal (a+c) outputted from the adder 45 is inputted into the non inverting input terminal (positive input terminal) of the differential amplifier 43, and the signal (b+d) outputted from the adder 46 is inputted into the inverting input terminal (negative input terminal) of the differential amplifier 43. Then, the differential amplifier 43 amplifies the value of the difference between these signals {(a+c)–(b+d)} by a predetermined amplification factor to output a focus error signal.

This focus error signal is a signal indicating the amount of deviation of the objective lens 32 in the optical axis direction (rotation axial direction) with respect to the focus point. Namely, the focus error signal is a signal which indicates both the amount and the direction of the deviation of the objective lens 32 in the optical axis direction (rotation axial direction) with respect to the focus point.

Next, the focus error signal is inputted into the servo processor 51. After carrying out predetermined signal processing operations (i.e., phase inversion, amplification and the like) for the focus error signal, the servo processor 51 generates a focus servo signal (voltage). Then, a predetermined driving voltage in response to such focus servo signal is applied to the actuator 4 via the driver 21. By driving the actuator 4, the objective lens 32 is moved toward the focus point. Namely, a focus servo operation is carried out based on the generated focus servo signal.

The optical disc drive 1 according to the present invention is able to judge whether or not an optical disc 2 is placed on the disc tray positioned at the loaded position (disc playing back position). Further, the optical disc drive 1 according to the present invention is able to discriminate the disc type of the loaded optical disc 2. Namely, the optical disc drive 1 is able to judge whether the loaded optical disc 2 is a CD-ROM (high-reflectance optical disc) or a CD-RW (low-reflectance optical disc). These judgements are carried out as described below.

First, by forcedly moving (displacing) the objective lens 32 in the optical axis direction, the optical disc drive 1 generates a focus error signal. Next, the optical disc drive 1 calculates the amplitude of the generated focus error signal. Then, based on such calculated amplitude, the optical disc drive 1 carries out the judgements described above.

Next, the processes carried out by the optical disc drive according to the present invention, that is the method of discriminating the various types of optical discs will be described with reference to the time chart shown in FIG. 4 and the flow chart shown in FIG. 5.

In this regard, FIG. 4(a) is a time chart showing the position of the objective lens 32 relative to the optical disc 2 when the objective lens 32 is being forcedly moved in the optical axis direction, FIG. 4(b) is a time chart showing the focus error signal generated when a CD-RW is loaded in the optical disc drive 1, and FIG. 4(c) is a time chart showing the focus error signal generated when a CD-ROM is loaded in the optical disc drive 1. Further, FIG. 5 is a flow chart showing the operations carried out in the control means 9.

First, a disc tray (not shown in the drawings) on which an optical disc 2 is placed is positioned at the loaded position (Step 101).

Further, at Step 101, a measurement completion flag and a CD-RW setting flag are cleared, and a setting for CD-ROM is carried out regardless of the disc type of the loaded optical disc 2. Namely, the focus servo gain (the amplification factor of the differential amplifier 43) and the tracking servo gain (the amplification factor of the differential amplifier 44) are set at their respective values established for a CD-ROM. In this regard, it should be noted that this setting for a CD-ROM is only a provisional setting and not a fixed setting.

Furthermore, at Step 101, the sled motor 7 is driven to move the optical pick-up 3 to a position corresponding to the read-in area (innermost position) of the optical disc 2.

Further, as will be described later, the measurement completion flag is a flag which indicates the completion of focus error signal measurements.

Accordingly, in the case where it is confirmed at Step 105 (described later) that a measurement completion flag has been established, the optical disc drive 1 judges that focus error signal measurements have completed. On the other hand, in the case where it is confirmed at Step 105 that a measurement completion flag has not yet been established (i.e., in the case where it is confirmed that the measurement completion flag is still in a clear state), the optical disc drive 1 judges that focus error signal measurements have not yet completed.

Further, the CD-RW setting flag is a flag which indicates that a setting for CD-RW has been established.

Accordingly, in the case where it is confirmed that a CD-RW setting flag has been established, the optical disc drive 1 judges that a setting for CD-RW has been established. On the other hand, in the case where it is confirmed that a CD-RW setting flag has not been established (i.e., in the case where it is confirmed that the CD-RW setting flag is still in a clear state), the optical disc drive 1 judges that a setting for CD-ROM has been established.

Next, a tracking offset adjustment is carried out to give the direct current component (DC component) of the tracking error signal a value of 0 (Step 102). This tracking offset adjustment is carried out in the servo processor 51.

Next, the laser diode 5 of the optical pick-up 3 is lighted (driven) (Step 103).

Next, a focus offset adjustment is carried out to set the reference level of the focus error signal at an appropriate level (Step 104). This focus offset adjustment is also carried out in the servo processor 51.

Next, a confirmation as to whether or not a measurement completion flag has been established is carried out (Step 105). In this way, it is possible to judge whether or not measurements of the focus error signal have been completed.

In the case where it is confirmed at Step 105 that a measurement completion flag has not been established, that is, in the case where it is judged that focus error signal measurements have not yet completed, measurements of the focus error signal are carried out over a predetermined time interval (e.g., over approximately 400 msec) (Step 106).

Figure 4:
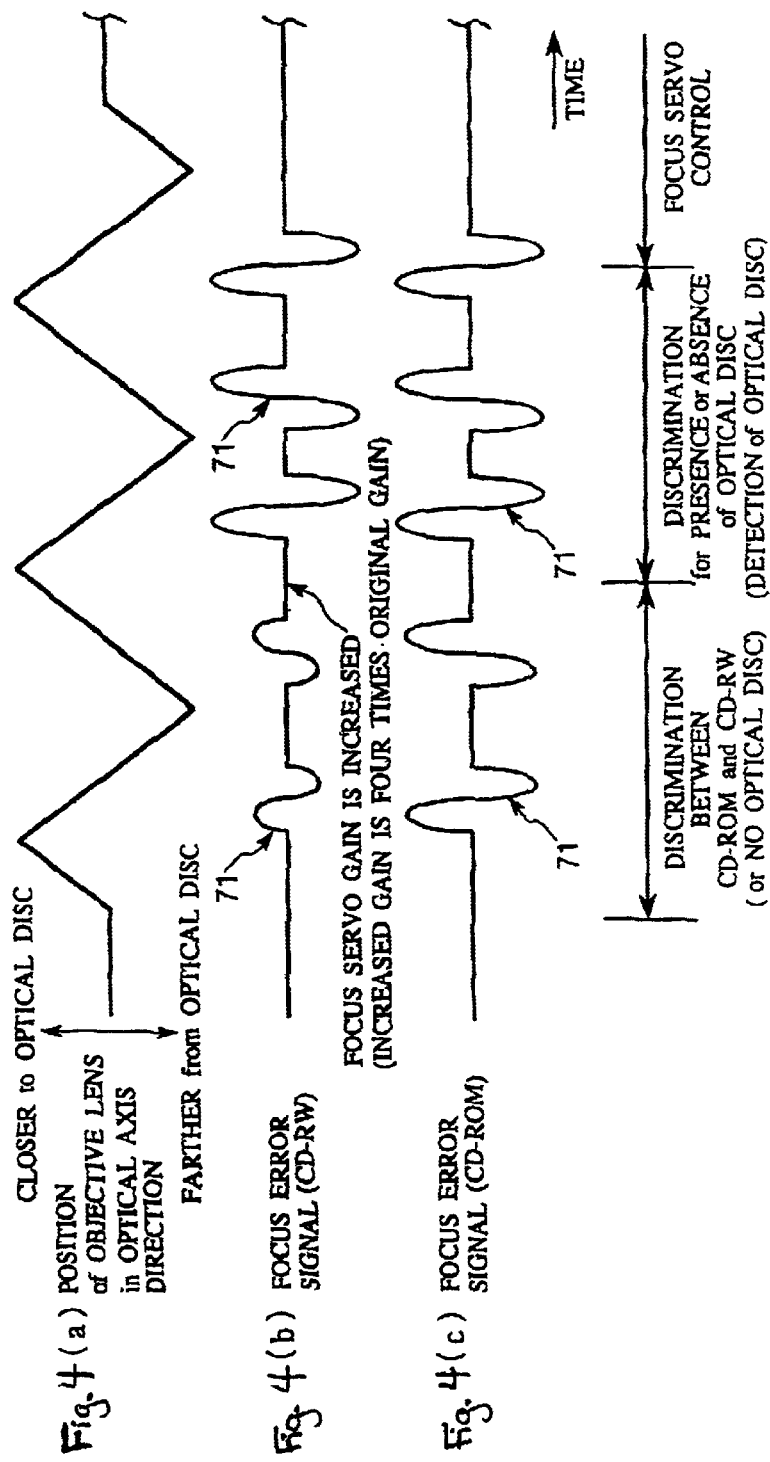
FIG. 4(a) is a time chart showing a position of an objective lens relative to of the optical disc drive when the objective lens is being forcedly moved in the optical axis direction thereof.
FIG. 4(b) is a time chart showing a focus error signal generated when a CD-RW is loaded in the optical disc drive.
FIG. 4(c) is a time chart showing a focus error signal generated when a CD-ROM is loaded in the optical disc drive.

At Step 106, the actuator 4 is driven as shown in FIG. 4(*a*) to move (displace) the objective lens 32 of the optical pick-up 3 in the optical axis direction (a direction perpendicular to the optical disc 2). Namely, the objective lens 32 is made to undergo reciprocal movement for a plurality of times (e.g., approximately two times) between a position closest to the optical disc 2 and a position farthest from the optical disc 2 within the range of possible movement, so that a plurality of (e.g., approximately four) S-shaped waveforms (S-shaped curves) 71 are generated. In this way, a focus error signal such as that shown in FIG. 4(*b*) or FIG. 4(*c*) is produced.

Then, the maximum value (i.e., the maximum value among the plurality of peak values) and the minimum value (i.e., the minimum value among the plurality of trough (bottom) values) of the generated focus error signal are respectively measured by the servo processor 51. Then, thus obtained values are stored in the register of the servo processor 51.

At this point, as shown in FIGS. 4(*b*) and 4(*c*), the amplitude of the focus error signal varies depending on the reflectance of the optical disc 2. Namely, the amplitude of the focus error signal for the case where a CD-RW is loaded is smaller than the amplitude of the focus error signal for the case where a CD-ROM is loaded.

Next, the minimum value of the focus error signal is read out from the register of the servo processor 51 (Step 107).

Next, the maximum value of the focus error signal is read out from the register of the servo processor 51 (Step 108). Then, based on this maximum value and the minimum value read out at Step 107, the amplitude of the focus error signal is calculated.

Namely, if "x" is the amplitude of the focus error signal, "y" is the maximum value of the focus error signal and "z" is the minimum value of the focus error signal, then the amplitude "x" can be calculated as shown by Equation (1) below.

$$x = y - z \qquad \text{Equation (1)}$$

Next, the measurement completion flag is set (Step 109).

Then, a judgement as to whether or not the amplitude of the focus error signal exceeds a threshold value is carried out (Step 110).

This threshold value is established in advance to have a value that is sufficiently smaller than the amplitude of the focus error signal for the case where a CD-ROM is loaded, and sufficiently larger than the amplitude of the focus error signal for the case where a CD-RW is loaded.

Accordingly, in the case where a CD-ROM is loaded in the optical disc drive 1, the calculated amplitude of the focus error signal exceeds the threshold value.

On the other hand, in the case where a CD-RW is loaded in the optical disc drive 1, or in the case where no optical disc is loaded in the optical disc drive 1, the calculated amplitude of the focus error signal is lower than the threshold value.

In the case where it is judged at Step 110 that amplitude of focus error signal is lower than threshold value ("NO" judgement at Step 110), the CD-RW setting flag is set (Step 111).

Next, at Step 112, settings for a CD-RW are established. In order to establish the settings for a CD-RW, the optical disc drive 1 sets (changes) the focus servo gain (the amplification factor of the differential amplifier 43) and the tracking servo gain (the amplification factor of the differential amplifier 44) at their respective values for a CD-RW. In this connection, the value set for a CD-RW should be, for example, 2.5 times or higher than that value set for a CD-ROM, in particular, should be approximately 3–7 times.

In this way, it becomes possible to increase the focus servo gain (the amplification factor of the differential amplifier 43) and the tracking servo gain (the amplification factor of the differential amplifier 44). In this connection, the setting for a CD-RW is only a provisional setting and not a fixed setting.

After the operations at Step 112 have been completed, the process returns to Step 102 and the steps described above starting from Step 102 are executed again.

Namely, as described above, a tracking offset adjustment is carried out (Step 102), and the laser diode 5 of the optical pick-up 3 is maintained in a driven state (Step 103). Then, after carrying out a focus offset adjustment at Step 104, a judgement as to whether or not measurements of the focus error signal have been completed is carried out by confirming an establishment of a measurements completion flag (Step 105).

At this point, it should be noted that a measurement completion flag was previously set at Step 109. Accordingly, at Step 105, the optical disc drive 1 judges that focus error signal measurements have been completed.

In the case where it is confirmed at Step 105 that a measurement completion flag has been established, namely, in the case where it is judged that focus error signal measurements have been completed, a detection of the optical disc 2 is carried out over a predetermined time interval (e.g., over approximately 500 msec) (Step 113).

At Step 113, operations similar to those performed in Step 106 are carried out. Namely, the actuator 4 is driven to move (displace) the objective lens 32 of the optical pick-up 3 in the optical axis direction (a direction perpendicular to the optical disc 2). Then, the maximum value and the minimum value of the generated focus error signal are measured by the servo processor 51. Next, the amplitude of the focus error signal is calculated based on such measured maximum and minimum values. Then, a judgement as to whether or not the amplitude of the focus error signal exceeds a threshold value is carried out.

This threshold value is established in advance to have a value that is sufficiently smaller than the amplitude of the focus error signal for the case where a CD-RW is loaded, and sufficiently larger than the amplitude of the focus error signal for the case where no optical disc is loaded.

Accordingly, in the case where an optical disc is loaded in the optical disc drive 1, the amplitude of the focus error signal exceeds the threshold value. On the other hand, in the case where no optical disc is loaded in the optical disc drive 1, the amplitude of the focus error signal is lower than the threshold value.

Then, in the case where the amplitude of the focus error signal exceeds the threshold value, a signal indicating that an optical disc has been loaded in the optical disc drive 1 is outputted from the servo processor 51 to the control means 9. On the other hand, in the case where the amplitude of the focus error signal is lower than the threshold value, a signal indicating that no optical disc has been loaded in the optical disc drive 1 is outputted from the servo processor 51 to the control means 9.

Further, due to the operations carried out at Step 112, the focus servo gain (the amplification factor of the differential amplifier 43) has already been increased. Accordingly, as shown in FIG. 4(b), the amplitude of the focus error signal for the CD-RW after the setting for the CD-RW has been established (that is, after the gain has been increased) is larger than the amplitude of the focus error signal for the CD-RW before the setting for the CD-RW is established (that is, before the gain is increased). As a result, the judgement as to whether or not an optical disc (CD-RW) is loaded in the optical disc drive 1 can be carried out more reliably.

Next, by referring to the signal indicating that "an optical disc is loaded" or the signal indicating that "no optical disc is loaded" outputted from the servo processor 51, the control means 9 judges whether or not an optical disc is placed on the disc tray which is positioned at the loaded position (Step 114).

Figure 5:
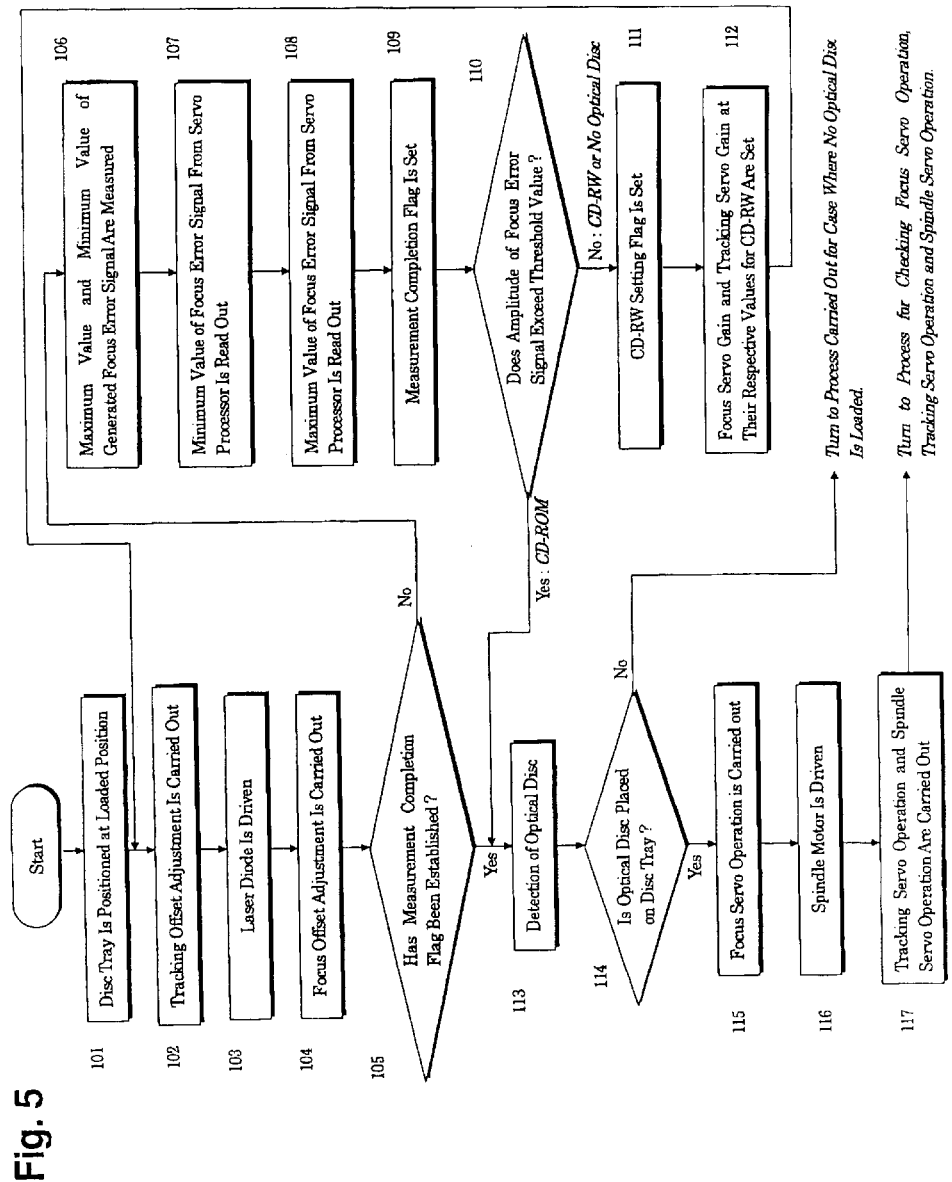
FIG. 5 is a flow chart showing the operations carried out in a control means of the optical disc drive shown in FIG. 1.

In the case where it is judged at Step 114 that no optical disc is loaded in the optical disc drive 1 ("NO" judgement at Step 114), the process program shown in FIG. 5 turns to the process carried out for the case where no optical disc is loaded. For example, this process may include operations such as the deactivation of the laser diode 5 of the optical pick-up 3. Further, when necessary, a process for emitting a predetermined alarm can be carried out.

On the other hand, in the case where it is judged at Step 114 that an optical disc is loaded in the optical disc drive 1 ("YES" judgement at Step 114), the focus servo control described above is carried out. Namely, while maintaining (fixing) the setting for a CD-RW, the focus servo operation is carried out (Step 115).

Next, the spindle motor 11 is driven (rotated) (Step 116).

Next, the tracking servo operation and the spindle servo operation are carried out (Step 117). Namely, the tracking servo control and rotation frequency control described above are started.

Next, the process program proceeds to a process for checking the focus servo operation, tracking servo operation and spindle servo operation.

The description given above was for the case where It is judged at Step 110 that amplitude of focus error signal is below the threshold value ("NO" judgement at Step 110).

On the other hand, in the case where it is judged at Step 110 that amplitude of focus error signal exceeds the threshold value ("YES" judgement as Step 110), the steps described above starting from Step 113 are carried out. Further, in the case where it is judged at Step 114 that an optical disc is loaded in the optical disc drive 1 ("YES" judgement as Step 114), the setting for the CD-ROM is maintained and the focus servo operation is carried out (Step 115).

As described above, the optical disc drive according to the present invention makes it possible to playback information recorded on optical discs categorized into two reflectance types. Namely, the optical disc drive according to the present invention makes it possible to playback information recorded on both high-reflectance optical discs (e.g., CD-ROM) and low-reflectance optical discs (e.g., CD-RW).

Further, according to the present invention, the optical disc drive judges that either a CD-ROM or a CD-RW has been loaded, thereby automatically establishing a setting corresponding to the disc type of the loaded optical disc. In this way it becomes possible to playback the information recorded on the loaded optical disc. This makes it possible to provide an optical disc drive which is simple to operate. Further, this also makes it possible to provide an optical disc drive which can reliably playback both information recorded on a CD-ROM and information recorded on a CD-RW.

Further, the optical disc drive according to the present invention includes a function for judging the presence or absence of an optical disc. Namely, the optical disc drive according to the present invention includes a function which makes it possible to judge whether or not an optical disc is placed on the disc tray which has been moved from the eject position to the loaded position. This judgement is carried out as follows.

Namely, the optical disc drive first makes a judgement as to whether or not an a CD-ROM is placed on the disc tray which has been moved to the loaded position. Then, in the case where it is judged that CD-ROM is not loaded, the focus servo gain (the amplification factor of the differential amplifier 43) is increased. Next, the optical disc drive makes a judgement as to whether or not a CD-RW is placed on the disc tray which has been moved to the loaded position.

In this way, it is possible to prevent the optical disc drive from starting the process for playing back information when no optical disc is loaded.

In the description given above, the optical disc drive according to the present invention was described with reference to the embodiment shown in the drawings. However, the structure of the optical disc drive according to present invention is not limited to such structure, and it is possible to make various changes.

Further, each of the elements in the embodiment of the optical disc drive according to the present invention described above may be replaced with other element if it has the same function.

For example, in the optical disc drive according to the present invention, the amplitude of the focus error signal may be calculated as follows. Namely, first, the maximum value (peak value) and minimum value (trough value) of each waveform in the generated focus error signal are measured. Next, the amplitude of each waveform is calculated based on the maximum value and minimum value thereof. Then, the average value of all such calculated amplitudes is established as the amplitude of the focus error signal. In this case, an intermediate value between the maximum amplitude and the minimum amplitude of all such calculated amplitudes may be established as the amplitude of the focus error signal.

Further, in the embodiment described above, the discrimination of the disc type of the optical disc loaded in the optical disc drive is carried out by comparing the amplitude of the focus error signal with a threshold value. In this way, it becomes possible to discriminate whether the optical disc loaded in the optical disc drive is a CD-ROM (high-reflectance optical disc) or a CD-RW (low-reflectance optical disc). Furthermore, in the present invention, the discrimination of the disc type of the optical disc loaded in the optical disc drive may be carried out by comparing a value corresponding to the amplitude of the focus error signal (e.g., a value obtained by multiplying the amplitude by a prescribed constant or adding a prescribed constant to the amplitude) with a threshold value.

Further, in the embodiment described above, the description was made based on the optical disc drive for playing back information recorded on an optical disc. However, the present invention is not limited to such a disc drive, and the present invention can be applied to optical disc drive which can play back information recorded on an optical disc and also record information onto a recordable or rewritable type optical disc.

Further, in the embodiment described above, the optical disc drive establishes a setting in accordance with the disc type of the loaded optical disc, and in this way the information recorded on the optical disc is reproduced. Namely, in the embodiment described above, in the case where the loaded optical disc is discriminated as a high-reflectance optical disc, the optical disc drive establishes a setting for playing back information recorded on a high-reflectance optical disc. Further, in the case where the loaded disc is discriminated as a low-reflectance optical disc, the optical disc drive establishes a setting for playing back information recorded on a low-reflectance optical disc. However, the settings established in the optical disc drive according to the present invention are not limited to those settings described above. For example, any appropriate setting corresponding to the disc type of the loaded optical disc may be established in the optical disc drive to make it possible to record information onto a loaded optical disc and play back the information recorded on the loaded optical disc.

Further, in the present invention, the designation of the high-reflectance optical disc is not limited to a CD-ROM. Namely, examples of the high-reflectance optical discs that can be used with the optical disc drive according to the present invention include CD (compact disc), CD-R, CD-ROM and other type optical discs having high-reflectance.

Further, in the present invention, the designation of a low-reflectance optical disc is not limited to a CD-RW. Namely, examples of high-reflectance optical discs that can be used with the optical disc drive according to the present invention include various low-reflectance optical discs other than CD-RW.

Further, the present invention can be applied to an optical disc drive which can play back information recorded on three or more types of optical discs or record information onto or play back information recorded on three or more types of optical discs.

As described above, the optical disc drive according to the present invention makes it possible to record information onto and/or playback information from various types of optical discs having different reflectances (i.e., high-reflectance optical discs and low-reflectance optical discs).

Further, the optical disc drive according to the present invention is constructed so as to be able to establish settings corresponding to the various types of optical discs having different reflectances. For example, in the case where the loaded optical disc is discriminated as a high-reflectance optical disc, the optical disc drive according to the present invention establishes a setting corresponding to a high-reflectance optical disc. Further, in the case where the loaded optical disc is discriminated as a low-reflectance optical disc, the optical disc drive according to the present invention establishes a setting corresponding to a low-reflectance optical disc. In this way, the optical disc drive according to the present invention makes it possible to reliably record information onto various types of optical discs having different reflectances and/or playback information recorded the various types of the optical discs.

Further, the optical disc drive according to the present invention includes an optical disc discrimination means for judging whether or not an optical disc is loaded. In this way, it is possible to prevent the optical disc drive from starting the process for recording or playing back information when no optical disc is placed on the disc tray which has been moved from the eject position to the loaded position.

What is claimed is:

1. An optical disc drive which can play back information recorded on and/or record information onto at least two types of optical discs having different reflectances, comprising:

a rotational drive mechanism for rotating an optical disc to be loaded in the optical disc drive;

an optical pick-up having an objective lens, said optical pick-up emitting light beam onto the loaded optical disc and receiving the light beam reflected by the optical disc through the objective lens, to generate detection signals in response to the amount of the received light beam;

focus error signal generating means for generating a focus error signal based on the detection signals; and optical disc discrimination means for discriminating a disc type of the loaded optical disc based on the amplitude of the focus error signal wherein the at least two types of optical discs include a high-reflectance optical disc and a low-reflectance optical disc and further wherein if the reflectance of a high-reflectance optical disc to be loaded in the optical disc drive is designated by "α" and the reflectance of a low-reflectance optical disc to be loaded in the optical disc drive is designated by "β", then the value of "α/β" is greater than or equal to 2.5.

2. The optical disc drive as claimed in claim 1, wherein the amplitude of the focus error signal varies depending on the reflectances of the respective optical discs.

3. The optical disc drive as claimed in claim 1, wherein the objective lens has an optical axis, in which the focus error signal is produced by displacing the objective lens in the optical axis direction, and then the optical disc discriminating means discriminates whether or not the loaded optical disc is a high-reflectance optical disc or a low-reflectance optical disc based on the thus produced focus error signal.

4. The optical disc drive as claimed in claim 1, wherein the optical disc discrimination means discriminate whether or not the loaded optical disc is a high-reflectance optical disc or a low-reflectance optical disc by comparing an amplitude of the focus error signal or a vale corresponding thereto with a predetermined threshold value.

5. The optical disc drive as claimed in claim 1, further comprising means for setting recording conditions and/or playing back conditions corresponding to the type of the loaded optical disc based on the result of the discrimination by the optical disc discrimination means.

6. The optical disc drive as claimed in claim 5, wherein the setting means sets recording and/or playing back conditions corresponding to a high-reflectance optical disc in the case where the loaded optical disc loaded is discriminated as a high-reflectance optical disc by the optical disc discrimination means, and sets recording and/or playing back conditions corresponding to a low-reflectance optical disc in the case where the loaded optical disc loaded in the optical disc drive is discriminated as a low-reflectance optical disc by the optical disc discrimination means.

7. The optical disc drive as claimed in claim 6, wherein the conditions to be set by the setting means include a focus servo gain and/or a tracking servo gain.

8. The optical disc drive as claimed in claim 1, wherein the optical disc discrimination means has a further function for judging as to whether or not an optical disc is loaded in the optical disc drive.

9. The optical disc drive as claimed in claim 8, wherein the optical disc discrimination means judges as to whether or not the loaded optical disc is a low-reflectance optical disc in the case where no high-reflectance optical disc has been detected by the discrimination means.

10. A method of discriminating a disc type of an optical disc loaded in an optical disc drive which can play back information recorded on and/or record information onto at least two types of optical discs having different reflectances, comprising the steps of:

rotating the optical disc loaded in the optical disc drive;

emitting light beam from an optical pick-up onto the loaded optical disc and receiving the light beam reflected by the optical disc by the optical pick-up, to generate detection signals in response to the amount of the received light beam;

producing a focus error signal based on the detection signals; and discriminating a disc type of the loaded optical disc based on the amplitude of the focus error signal which varies depending on the reflectance of the optical discs wherein the at least two types of optical discs include a high-reflectance optical disc and a low-reflectance optical disc and further wherein if the reflectance of a high-reflectance optical disc to be loaded in the optical disc drive is designated by "α" and the reflectance of a low-reflectance optical disc to be loaded in the optical disc drive is designated by "α", then the value of "α/β" is greater than or equal to 2.5.

11. The method as claimed in claim 10, wherein the focus error signal is produced by displacing the objective lens in the optical axis direction, and then the loaded optical disc is discriminated as a high-reflectance optical disc or a low-reflectance optical disc based on the thus produced focus error signal.

12. The method as claimed in claim 10, wherein the discrimination is carried out by comparing an amplitude of the focus error signal or a vale corresponding thereto with a predetermined threshold value.

13. The method as claimed in claim 12, wherein the discriminating step includes a first step for judging as to whether the loaded optical disc is a high-reflectance optical disc or not, and a second step for judging as to whether the loaded optical disc is a low-reflectance optical disc or not, wherein the second step is carried out in the case where no high-reflectance optical disc has not been detected by the first step.

14. The method as claimed in claim 13, wherein the focus servo gain at the first step is grater than that at the second step.

15. The method as claimed in claim 13, wherein the amplification factor for the focus error signal at the first step is grater than that at the second step.

16. The method as claimed in claim 13, further comprising a step for judging as to whether or not an optical disc is loaded in the optical disc drive.

17. The optical disc drive as claimed in claim 1 wherein the amplitude of the focus error signal is obtained by measuring the maximum value and/or the minimum value of the focus error signal.

18. The optical disc drive as claimed in claim 17 wherein each of the maximum value and the minimum value of the focus error signal is obtained based on a plurality of peak values and a plurality of bottom values of the wave of the focus error signal.

19. The optical disc drive as claimed in claim 17 wherein the discrimination of the disc type of the loaded optical disc is carried out by comparing the amplitude of the focus error signal with a predetermined threshold value which is determined based on the difference between the reflectances.

20. The method as claimed in claim 10 wherein the amplitude of the focus error signal is obtained by measuring the maximum value and/or the minimum value of the focus error signal.

21. The method as claimed in claim 10 wherein each of the maximum value and the minimum value of the focus error signal is obtained based on a plurality of peak values and a plurality of bottom values of the wave of the focus error signal.

22. The method as claimed in claim 20 wherein the discrimination of the disc type of the loaded optical disc is carried out by comparing the amplitude of the focus error signal with a predetermined threshold value which is determined based on the difference between the reflectances.

* * * * *

UNITED STATES PATENT AND TRADEMARK OFFICE
CERTIFICATE OF CORRECTION

PATENT NO. : 6,760,289 B1
DATED : July 6, 2004
INVENTOR(S) : Ide

It is certified that error appears in the above-identified patent and that said Letters Patent is hereby corrected as shown below:

Column 3,
Line 24, change "Judging" to -- judging --
Line 33, change "grater" to -- greater --

Column 8,
Line 64, delete "is positioned"

Column 10,
Line 47, insert -- the -- before "focus"

Column 12,
Line 23, change "It" to -- it --

Column 13,
Line 12, change "other" to -- another --
Line 45, insert -- the -- before "optical"

Column 14,
Line 38, insert -- on -- after "recorded"

Signed and Sealed this

Second Day of November, 2004

JON W. DUDAS
*Director of the United States Patent and Trademark Office*